United States Patent [19]

Krenchel et al.

[11] 4,261,754
[45] Apr. 14, 1981

[54] FIBER REINFORCED BUILDING PRODUCTS AND METHOD OF PRODUCING SAME

[75] Inventors: Herbert E. Krenchel; Jørgen A. Ottosen, both of Copenhagen-Hellerup; Jørgen Balslev, Copenhagen-Holte, all of Denmark

[73] Assignee: Dansk Eternit-Fabrik A/S, Aalborg, Denmark

[21] Appl. No.: 902,920

[22] Filed: May 4, 1978

[30] Foreign Application Priority Data

May 5, 1977 [GB] United Kingdom ............... 18983/77

[51] Int. Cl.³ ............................................... C04B 7/35
[52] U.S. Cl. .................................... 106/90; 106/99
[58] Field of Search ................................. 106/99, 90

[56] References Cited

U.S. PATENT DOCUMENTS 3,591,395  7/1971  Zonsveld et al. ........................ 106/99

Primary Examiner—James Poer
Attorney, Agent, or Firm—Pennie & Edmonds

[57] ABSTRACT

A fibrous reinforcing element made from oriented polyolefin material for reinforcing a matrix material such as cement has longitudinally varying cross-sections and frayed surface portions from which fibrils extend. The element has cross-sections which vary along its length, a characteristic which combines with the fibrils of the frayed surface portions to facilitate anchoring of the element in the matrix. The anchoring and strength characteristics make the element particularly useful for constructing cement building products or any product produced from a matrix binding agent. The element is in the form of a fiber made from a polyolefin film which is stretched at least fifteen times and then cut by cutting means along lines at least partially transverse to the direction of orientation. In the preferred embodiment a building product formed from a matrix of Portland cement has dispersed therein, a plurality of fibrous reinforcing elements at least a portion of which are the individual polyolefin fibers described in accordance with the invention. By uniquely providing a combination of the inventive fibers with fibers of other types within the cement matrix, improved anchoring and dispersion of the fibers is achieved, while the improved strength characteristics of the elements contributes to a building product of unusually improved strength.

24 Claims, 5 Drawing Figures

FIBER REINFORCED BUILDING PRODUCTS AND METHOD OF PRODUCING SAME

BACKGROUND OF THE INVENTION

1. Field of the Invention

This invention relates to a method of manufacturing a building product by mixing a hydraulic binding agent, preferably Portland cement, as a matrix with a fibre reinforcement and to the product so manufactured. Particularly, but not exclusively, the invention is concerned with the manufacture of fibre reinforced building sheets and the composition of sheets so manufactured.

2. Description of the Prior Art

Fibre reinforced building products of the construction described are well known. Such products are based on a matrix consisting mainly of a hydraulic binding agent such as Portland cement, alumina cement, fly ash cement, lime, gypsum, diatomaceous earth, puzzolan and mixtures thereof. Fibres used for the reinforcement may be organic or inorganic fibres or a mixture of fibres, and fibres which have been proposed include asbestos, glass fibres, steel fibres, mineral fibres, cellulose fibres and plastics fibres.

The resources of asbestos fibres suitable for the production of such fibre reinforced building products are limited and for many purposes it is desirable to avoid the use of asbestos as reinforcement fibres. Further it is a drawback when using glass fibres and steel fibres that such fibres are very expensive, and to achieve the same extent of reinforcement the expenditure will be 4–5 times as high as if asbestos had been used. Besides, glass fibres and steel fibres are inclined to decompose to some extent, the latter only insignificantly though, and only at the surface of the fibre reinforced material, whereas the former continuously undergo a certain decomposition as a consequence of the alkali-nature of the cement.

From British Pat. Specification No. 1,130,612 it is known to use fibrous reinforcement components made from an elongated and subsequently fibrillated plastic film material, preferably a polyolefin film. The above-mentioned disadvantages in connection with asbestos fibres, glass fibres and steel fibres do not occur when the aforesaid material is used in a mortar consisting of e.g. Portland cement and gravel, but because of their extremely smooth surface only a poor bondage to the matrix after setting of same is achieved. The fibre reinforcement known from said British patent specification consists of twisted plastic twine weighing 1–1.5 g/m, and having been cut to filaments of approx. 75 mm. The twine is made as a so-called split fibre material from a film-shaped plastic band, which upon extrusion and cooling has been stretched approx. ten times its original length. The stretching causes the structure of the plastic material to become more orientated with resultant significantly increased tensile strength lengthwise, and significantly reduced tensile strength perpendicularly thereto.

Because of its poor tensile strength crosswise, the elongated material gets a natural tendency to split-up; this splitting-up may e.g. be brought about by twisting the stretched plastic film band around its longitudinal axis, and by further mechanical impact, e.g. as a consequence of blows or forces of friction from stone and gravel particles during admixing in a concrete mixer, in a method according to which they are split-up in several thinner strings. By the known splitting-up the division into thinner strings will always take place along the native weakest lines or areas of the material parallel to the direction of elongation of the band. Thus the fibres formed get rectangular cross-sections, always completely smooth surfaces, and constant cross-section throughout their length, this being the reason why it has been impossible to achieve an anchorage more satisfying than is the case with the usual round fibres. The smooth surface and the constant cross-section of the plastic fibres used up to now also account for the inadequate control of a homogeneous crack distribution in the hardened plastic fibre reinforced product. This disadvantage is further aggravated by the fact that the crosswise contraction properties of the plastic materials are extraordinarily high, viz. 0.4–0.5 as compared with approx. 0.2 in case of glass and approx. 0.3 in case of steel. Thus by elongation, the smooth fibre will, as soon as strain is applied, get thinner, by which it loses intimate contact with the surrounding matrix along smaller or larger areas of its circumference, and along its entire longitudinal direction.

As a remedy it has been suggested only to let the splitting-up take place along a section of the full length of the twine, offset within the fibre bundle, so that when spreading the bundle, a material is achieved which may resemble netting having various widths of meshes. It is said that by this is achieved an anchorage which cannot be obtained with the usual round plastic fibres, but also the reinforcement of this kind is insufficient. The comparatively few crossing points, which by the way separately are rather weak as the splitting-up may just continue, are unable to a significant extent to surmount the influence of the very long areas with completely smooth cleavage faces, deriving from the splitting-up, to which a cement matrix cannot adhere, and consequently they do not yield the desired effect. The known plastic fibre twine is shown in FIG. 1 on the drawing.

The known splitting up of fibres may take place by exposing the stretched plastic film to a certain physical treatment. However, they form coherent bundles of fibre filaments even after the vigorous handling they are exposed to as a result of the mixing with gravel and stone in the concrete mixer. The cross-section of the individual fibres will still be so large that a certain resilient movement will occur when the fibres have been bent, which is the case after compression of the fibre containing concrete mass, and this in itself causes a poor anchorage of the fibres too.

SUMMARY OF THE INVENTION

By means of the new method of manufacturing according to the invention improvements are obtained in the fibre reinforcement of which at least part of the fibres is flexible organic fibres of the polyolefin type made by chopping into short lengths stretched and fibrillated preferably heat stabilized film material, which fibrillating is caused by mechanically splitting the stretched film material before mixing in a slurry to obtain single polyolefin filaments of about 2 to 35 denier dispersed in the slurry which is allowed to set after forming or moulding.

Thus in the preparation of the reinforcement in the form of the stretched film material, stretched in one or more stages, the fibrillating is carried out by means of rollers with cutters or needles which cut or split the stretched film partly across the direction of the strong cores of the material.

The fibres are thereby fibrillated in such manner that they are frayed at the edges thereby improving the binding of the fibres in the matrix. However, it is important that the reinforcement is obtained by splitting it up completely into single filaments dispersed in the slurry which is obtained by the method.

Preferably the fibres are polypropylene fibres which are able to withstand direct or indirect influence from variations in light and temperature which for building parts may vary from about minus 20° C. up to about 120° C. By polypropylene fibres is in this context especially included pure polypropylene fibres made on the basis of a film material without polyethylene usually admixed to facilitate the drawing and stretching of the film material.

According to a preferred feature of the invention the fiber material is dispersed in a part of the binding agent, which thereafter is mixed with the remainder of the matrix material.

Because of the frayed edges and uneven character of the fibres and the many attached and very thin fibrils, the fibres in question are very difficult to disentangle and distribute evenly in the matrix material. In order to achieve the necessary dispersion of the fibres, the admixing may in a first step preferably take place in part of the matrix material f.inst. in a neat Portland cement matrix.

Thus it is an advantage that the dispersion of the fibres is made in a fat or highly viscous fluid.

Figure 1:
FIGS. 1-4 are photomicrographs of the fibers of the invention.

From the concrete manufacturing industries it is a well known fact that a high strength is obtained with a low water-cement ratio whereas asbestos cement requires a high water-cement ratio to obtain acceptable strengths of the articles.

Surprisingly enough it has been realized that the strength of articles made in this manner with a low water-cement ratio and said fibres are increased considerably compared to asbestos-cement articles manufactured with the required high water-cement ratio.

To improve the adherence of the flexible organic fibres the surface of them may be treated with an inorganic fine grained filler material or part of the binding agent before mixing with the matrix material. The fine grained filler material also serves to plasticise the mixture to obtain an even dispersion of the fibres.

Further improvements in the admixing may be obtained in a method according to the invention in which the admixing of the fibres to the matrix mass is carried out with the addition of a dispersing agent.

The dispersing agent may serve to improve the distribution of the fibres and part of the fibres may serve as dispersing agent as for instance cellulose fibres but also chemical compounds such as methylcellulose, hydroxypropylmethylcellulose, polysiloxanes, silicon oils, mineral oils with silicone derivates etc. may be used also to improve the affinity of the fibres and avoid lumping of the fibres and thereby improving the random orientation of the fibres.

The admixing of the fibres in an amount up to about 20 percent by volume to the matrix material may be performed in mixers preferably without stirring devices, for instance in mixers of the vibrating, shaking or tumbling type.

The method according to the invention is especially applicable in a process in which the product is manufactured in the form of sheets on fibre-sheet-forming machinery with suction equipment for dewatering the green sheets in the forming process.

The mixture of fibres cooperate to obtain a perfect performance of the slurry in the machinery of the aforesaid kind.

The other fibres consist of cellulosic fibres and perhaps mineral wool fibres or the like and, added properly, they can, because of their very large specific surface, ensure an even distribution of the cement particles in the complicated grate system that the plastic fibres form, and when the water surplus is subsequently sucked away during the setting and forming of the material, the carrying fibres form a filter which prevents that the cement particles are drawn away from the surface of the plastic fibres.

An improved product is obtained when according to the invention the sheets are subjected to a compression during a time interval after forming.

The present invention further comprises a fiber reinforced building product which consists of a matrix of a hydraulic binding agent preferably Portland cement and reinforcing fibres of which at least a part comprises single filaments of polyolefin fibres preferably polypropylene fibres made on the basis of a film material which has been stretched at least about 15 times to a final thickness of about from 10 to 60 microns and fibrillated by means of rotating needle or cutter rollers to obtain a fiber material having a tensile strength of 4000 to 6000 kp/cm$^2$, a modulus of elasticity of $7-10 \times 10^4$ kp/cm$^2$ and an elongation up to 8 percent the length of said fibres being between 5 and 25 mm.

It has proved itself that the fibres according to the invention, as a result of their firm anchorage in the cement are capable of absorbing the full tensile load when the cement gives up, and that at the same time they, because of shearing stresses along the fibre surface, can force through a distribution of microcracks so extraordinarily fine that the product gets to function as a homogeneous one-component material to the very point of breaking having an extension which may be 10-100 times that which is the case with unreinforced matrix material; such extension has been unattainable when using the plastic fibre reinforced building materials known up to now.

Figure 2:
Figure 3:
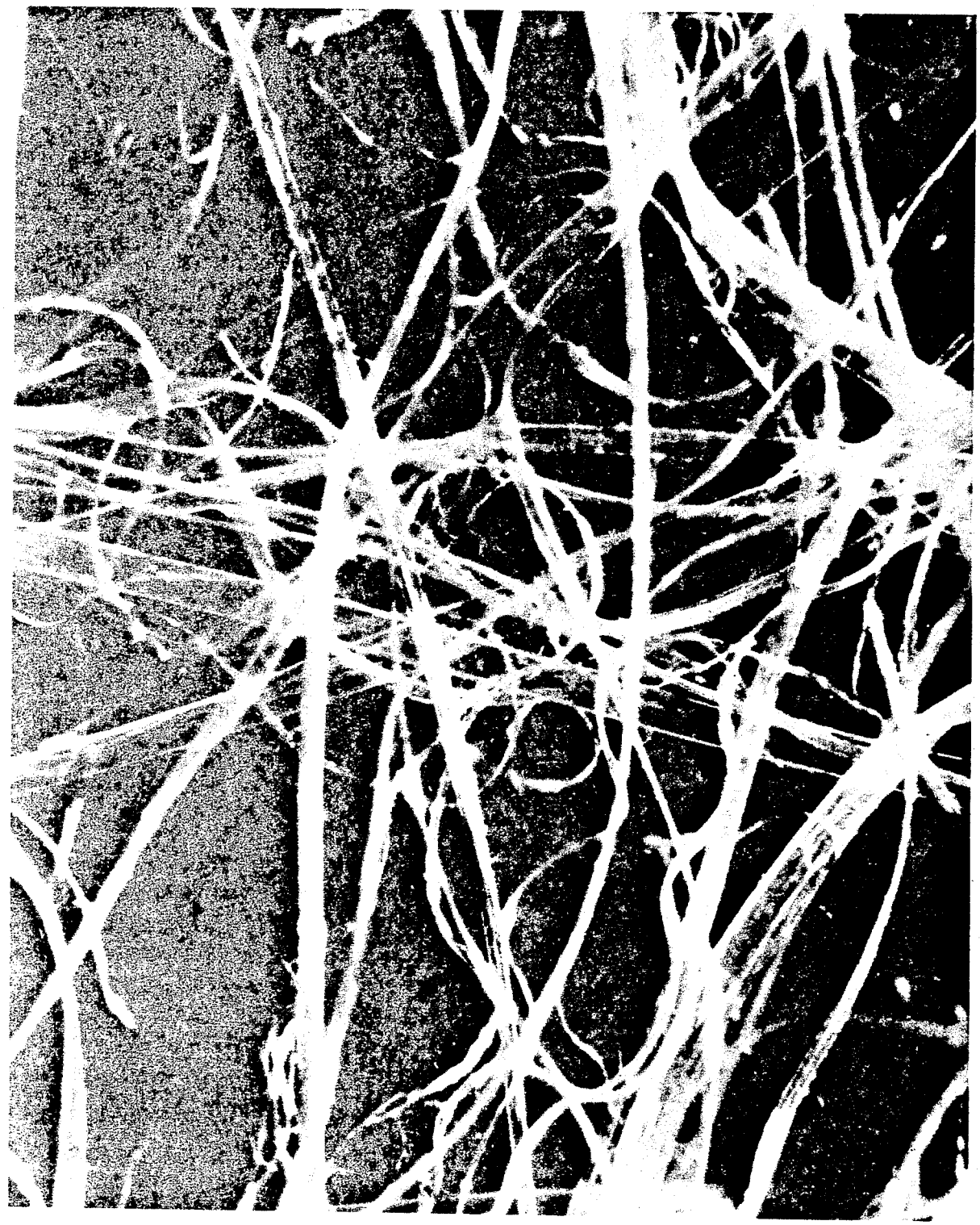
Figure 4:

When splitting-up by means of the cutter or needle roller of the plastic film material stretched close to the limit of rupture, the plastic film is split-up into little strips and units of somewhat differing widths, normally between 3 and 7 times the gauge of the plastic film. FIG. 2 of the drawing shows a cross-section through such a fibre bundle. When splitting up it is important that the cutting is made at places which do not coincide with the native weakest areas in the material. When cutting, the plastic film is cut through somewhat at random, and often in directions deviating from the direction of elongation, which presumably happens because the roller path when hit by one or other of the needles or cutters, respectively, is pushed into certain sidewise movements in its own plane. Consequently, cutting over of the strong cores or weins of the material often occurs—this causing a certain fraying of the areas of cut—and further, the cross-section of the individual fibres differ in the longitudinal direction. Both these facts appear from FIGS. 3 and 4 of the drawing. The fine fibrils and the fraying can be seen anywhere in the areas of cut, and it is also evident that the two areas of cut are not quite parallel as is the case with the naturally split-up stretch film, but that they project and recess at random in the case of each individual fibre. These instances of unevenness cause the particularly fine anchorage and mechanical interlocking of the fibres in the building material according to the invention.

Splitting-up of a plastic film material by means of cutter or needle rollers is known per se, but it is novel to cut it over in order to divide the material, thus achieving single filaments and to use these non-smooth fibres with uneven cross-sections and the abovementioned stipulated properties, as plastic fibre reinforcement in the form of single filaments in a building material; the reason for this is maybe to be found in the fact that the plastic fibres here mentioned as a consequence of their peculiar nature are much more difficult to distribute in a cement material than is the case with the smooth plastic fibre materials used up to now.

It has been tried, without sucess, to disperge polyolefine fibres in water according to the normal procedure which is used also when disperging f.inst. asbestos fibres with a view to producing asbestos cement, or as is the normal procedure in case of cellulosic fibres. The more agitation the more the fibres entangle. However, when using a mixture of fibres including carrying fibres, f.inst. cellulose fibres, it has turned out that a normal dispersion may be obtained even without the addition of disperging additives. Surprisingly enough, it has turned out that when using a fat or highly viscous fluid a perfect disperging may be carried through quite easily.

Figure 5:
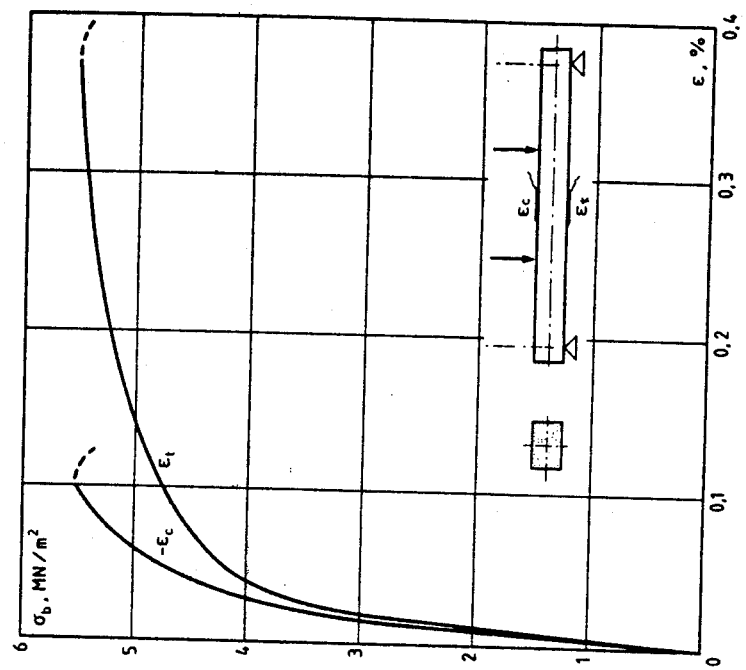
FIG. 5 shows stress-strain curves from bending tests with various materials.

The fibre reinforced materials according to the invention have been thoroughly tested in the laboratories and in actual use and compared with f.instance usual asbestos reinforced cement products prepared in the same manner with the same compression they show stress-strain characteristica on the same level, whereas the elongation at rupture and the impact resistance have been found to be considerably higher, viz. 3 to 5 times those of the asbestos reinforced cement products. FIG. 5 illustrates stress-strain curves from bending tests with various materials.

Curve I shows an unreinforced cement matrix. Curve II shows a cement matrix reinforced with smooth polypropylene-twine and curve III illustrates a product reinforced according to the invention. In the drawing is:

Ordinate $\sigma$, edge bending stress,
abscissa $\epsilon$, edge strains in the tensile and the compressive zone (both shown as positive) respectively $\epsilon_t$ and $\epsilon_c$.

According to a modification of the invention the polypropylene fibres are composed of two sizes of fibres, the ratio of the lengths being about 1:3. By using various sizes of the fibres an improved dispersion of the fibres in an interlaced fashion is obtained for inst. with a mixture comprising 6 mm and 18 mm fibres.

Other types of fibres, especially cellulose fibres and or mineral fibres are added to improve the filtration characteristics of the slurry, i.e. as mentioned above to serve as a filter forming base in the prepared slurry enabling sheets to be prepared on conventional sheet manufacturing machinery in which a layer of slurry is deposited on a screen or felt with simultaneous dewatering by suction. Meanwhile, these relatively fine fibres serve as a strong bond of the matrix mass.

According to an important feature of the invention the matrix material includes a fine grained inorganic filler material of a size range in which 85 percent is smaller than 1 micron.

The fine grained material has as mentioned above an important function during preparation of the slurry for the manufacturing of the product by plasticising the mass and in some instances also by serving as a temperature regulating additive to keep the reaction temperature within certain limits. However, in the product prepared the fine grained filler material f.inst. puzzolan or fine grained slag serves to react with and control the free lime always present in the product and further improves the strength of the product.

We claim:

1. A method of manufacturing a building product comprising mixing a slurry of an inorganic binding agent as a matrix and a plurality of fibrous reinforcing elements at least a portion of which are flexible, organic oriented polyolefin fibers, each having a weight about from 2 to 35 denier and having cross sections which vary along its length and polyolefin fibrils extending from surface portions thereof, and permitting said slurry to set after forming or moulding.

2. A method of manufacturing a building product according to claim 1, in which the polyolefin fibers are polypropylene fibers.

3. A method of manufacturing a building product according to claim 1 or 2, in which said fibers are dispersed in at least a part of the binding agent, which thereafter is mixed with the remainder of the matrix material.

4. A method of manufacturing a building product according to claim 1, in which the surface of the flexible organic fibers is treated with an inorganic fine grained filler material or the binding agent before mixing with the matrix material.

5. A method of manufacturing a building product according to claims 1, in which the admixing of the fibres to the matrix mass is carried out with the addition of a dispersing agent.

6. A method of manufacturing a building product according to claim 1, in which the product is manufactured in the form of sheets on fiber-sheet-forming machinery having suction equipment for dewatering the green sheets in the forming process.

7. A method of manufacturing a building product according to claim 6 in which the sheets are subjected to a compression during a time interval after forming.

8. A fiber reinforced building product manufactured from a matrix of an inorganic binding agent and a plurality of fibrous reinforcing elements at least a portion of which includes individual filaments of oriented polyolefin fibers cut from polyolefin filaments cut from polyolefin film material which has been stretched at least about 15 times to a thickness of about from 10 to 60 microns, said fibers having cross sections which vary along their length and polyolefin fibrils extending from surface portions thereof, each polyolefin fiber further having a tensile strength of at least about 4000 kp/cm$^2$, a modulus of elasticity of at least about $7 \times 10^4$ kp/cm$^2$ and a maximum elongation of up to about 8 percent of the length, said fibers being about from 5 to 25 mm in length.

9. A fiber reinforced building product according to claim 1 in which the polypropylene fibers are composed of two sizes of fibers the ratio of the lengths being about 1:3.

10. A fiber reinforced building product according to claim 1 in which at least part of the fibers is cellulosic fibers.

11. A fiber reinforced building product according to claim 10 in which part of the fibers is inorganic mineral fibers.

12. A fiber reinforced building product according to claim 1 in which the matrix material includes a fine grained inorganic filler material of a size range in which 85 percent is smaller than 1 micron.

13. A method of manufacturing a building product according to claim 2, in which the inorganic binding agent is a hydraulic binding agent.

14. A method of manufacturing a building product according to claim 1, in which the polyolefin fibers are heat stabilized and the hydraulic binding agent is Portland cement.

15. A method of producing a building product comprising the steps of:
 (a) taking polyolefin film material capable of being molecularly oriented by stretching so as to define a direction of orientation;
 (b) stretching said orientable film material at least about fifteen times its length to a thickness of about from 10 to 60 microns;
 (c) cutting said film material by means of a rotating needle or cutter roller along lines at least partially transverse to the lines of natural weakness caused by the molecular orientation of said material to thereby produce filaments having cross sections which vary along their lengths and frayed surface portions with fibrils of said material extending therefrom;
 (d) cutting said filaments into relatively short lengths to produce fibrous reinforcing elements capable of being anchored in a matrix admixture and to maintain surface contact with the admixture to provide fiber reinforcement of a product produced from said admixture;
 (e) mixing said polyolefin fibrous reinforcing elements with a plurality of at least one of cellulosic and inorganic mineral fibrous reinforcing elements;
 (f) mixing said fibrous reinforcing elements with a hydraulic binding agent;
 (g) mixing said hydraulic binding agent and fibrous reinforcing elements in the form of a wet slurry; and
 (h) permitting said admixture to set after forming or moulding.

16. A building product according to claim 8 in which said polyolefin fibers are polypropylene fibers.

17. A fiber reinforced building product manufactured from a matrix slurry of an inorganic binding agent such as Portland cement and a plurality of fibrous reinforcing elements, at least a portion of which are single filaments of oriented polyolefin fibers each having a tensile strength of about from 4000 to 6000 kp/cm$^2$, a modulus of elasticity of about from 7 to $10 \times 10^4$ kp/cm$^2$ and a maximum elongation of up to about 8 percent, said polyolefin fibers being between 5 and 25 mm in length and having cross sections which vary along their length and frayed edges with fibrils extending therefrom so as to permit anchoring of said fibers in the matrix slurry.

18. A building product according to claim 17 in which said single filament polyolefin fibers are polypropylene fibers.

19. A building product according to claim 18 in which said single filament fibers are polypropylene fibers of about from 2 to 35 denier cut from polypropylene filaments cut from polypropylene film which has been stretched at least about 15 times its original length to a final thickness of about from 10 to 60 microns.

20. The method according to claim 1 wherein said polyolefin fibers have a tensile strength of at least about 4000 kp/cm$^2$.

21. The method according to claim 1 wherein said polyolefin fibers have a modulus of elasticity of at least about $7 \times 10^4$ kp/cm$^2$.

22. The method according to claim 1 wherein said polyolefin fibers have a maximum elongation of up to about 8 percent of the length.

23. The method according to claim 1 wherein said polyolefin fibers are about from 5 to 25 mm in length.

24. The method according to claim 15 further comprising the step of applying heat to said stretched film material to stabilize said material in said stretched condition prior to the step of cutting said material by means of a rotating needle or cutter roller.

* * * * *

UNITED STATES PATENT AND TRADEMARK OFFICE
CERTIFICATE OF CORRECTION

PATENT NO. : 4,261,754
DATED : April 14, 1981
INVENTOR(S) : HERBERT EDWARDS KRENCHEL ET AL.

It is certified that error appears in the above—identified patent and that said Letters Patent is hereby corrected as shown below:

Title Page, item [75] should read

-- Inventors: Herbert E. Krenchel; Jørgen A. Ottosen, both of Copenhagen-Hellerup; Jørgen Balslev, Copenhagen-Holte, Laust Ørum Madsen, Esbjerg-Saedding, all of Denmark --

Signed and Sealed this

Seventeenth Day of November 1981

[SEAL]

Attest:

GERALD J. MOSSINGHOFF

Attesting Officer     Commissioner of Patents and Trademarks